Nov. 1, 1949     H. W. PROTZELLER     2,486,876
APPARATUS FOR AND METHOD OF FREEZING FOOD
Filed Nov. 18, 1943     6 Sheets-Sheet 1
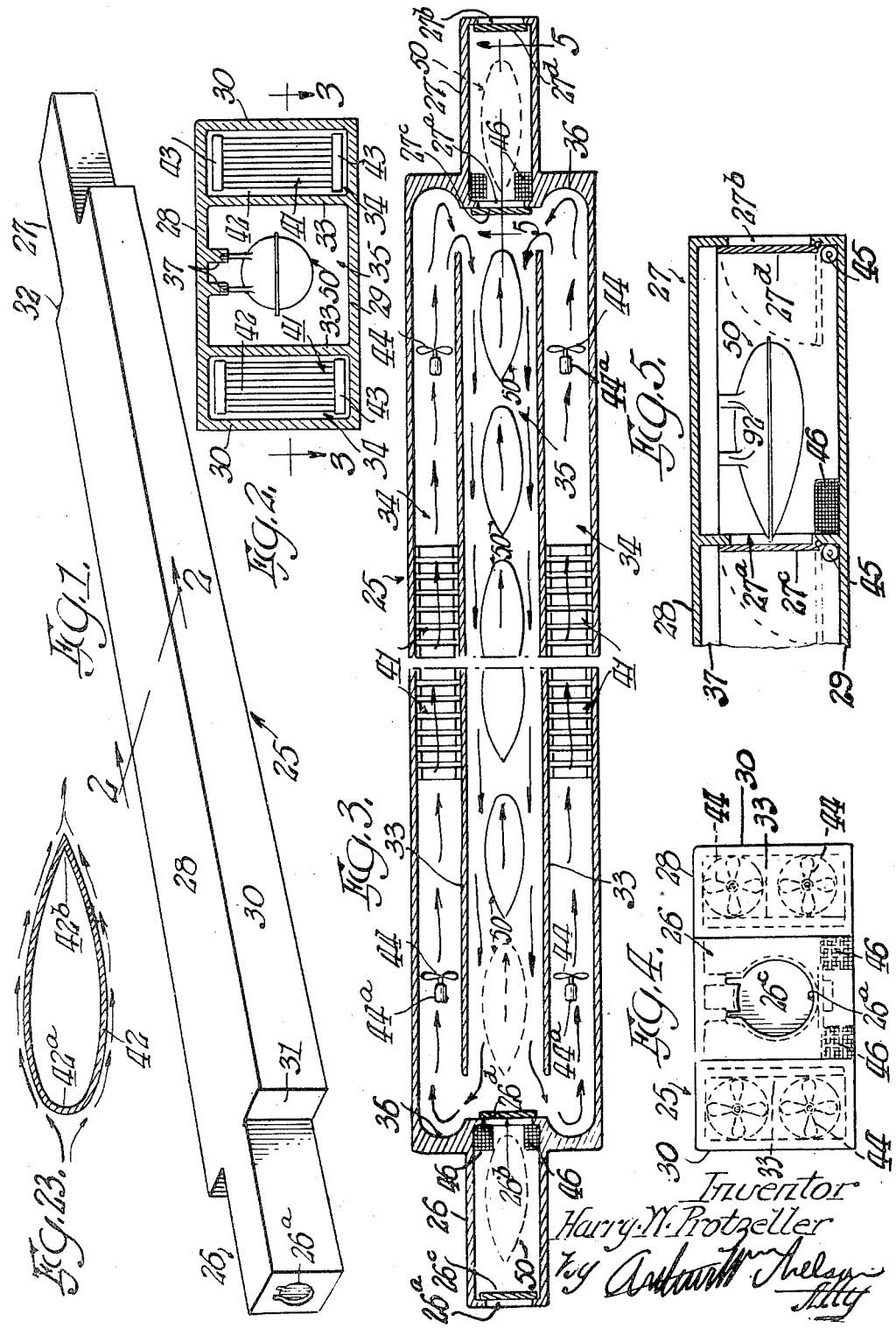
Inventor
Harry W. Protzeller Nov. 1, 1949     H. W. PROTZELLER     2,486,876
APPARATUS FOR AND METHOD OF FREEZING FOOD
Filed Nov. 18, 1943                         6 Sheets-Sheet 2
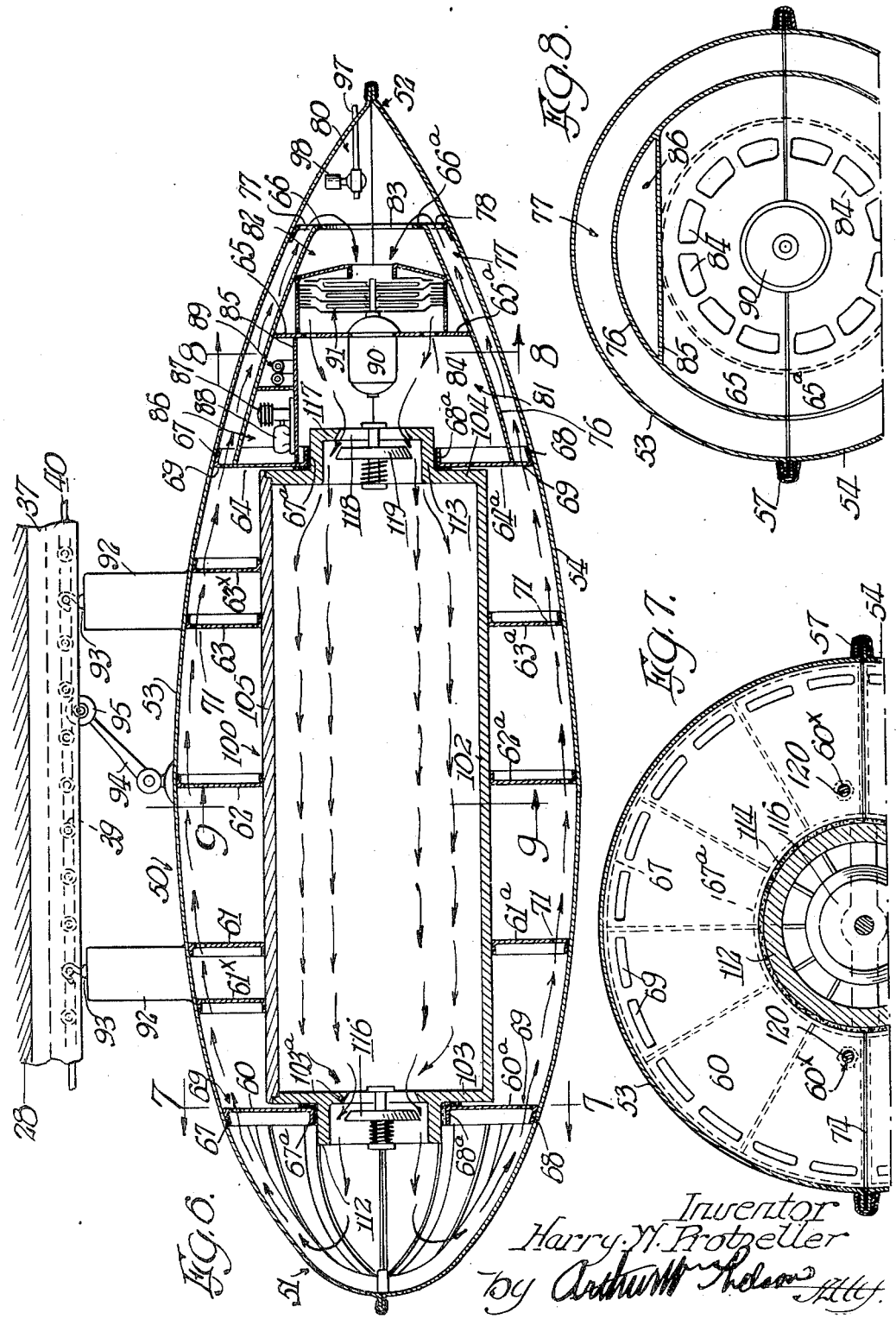
Inventor
Harry W. Protzeller Nov. 1, 1949     H. W. PROTZELLER     2,486,876
APPARATUS FOR AND METHOD OF FREEZING FOOD
Filed Nov. 18, 1943     6 Sheets-Sheet 3
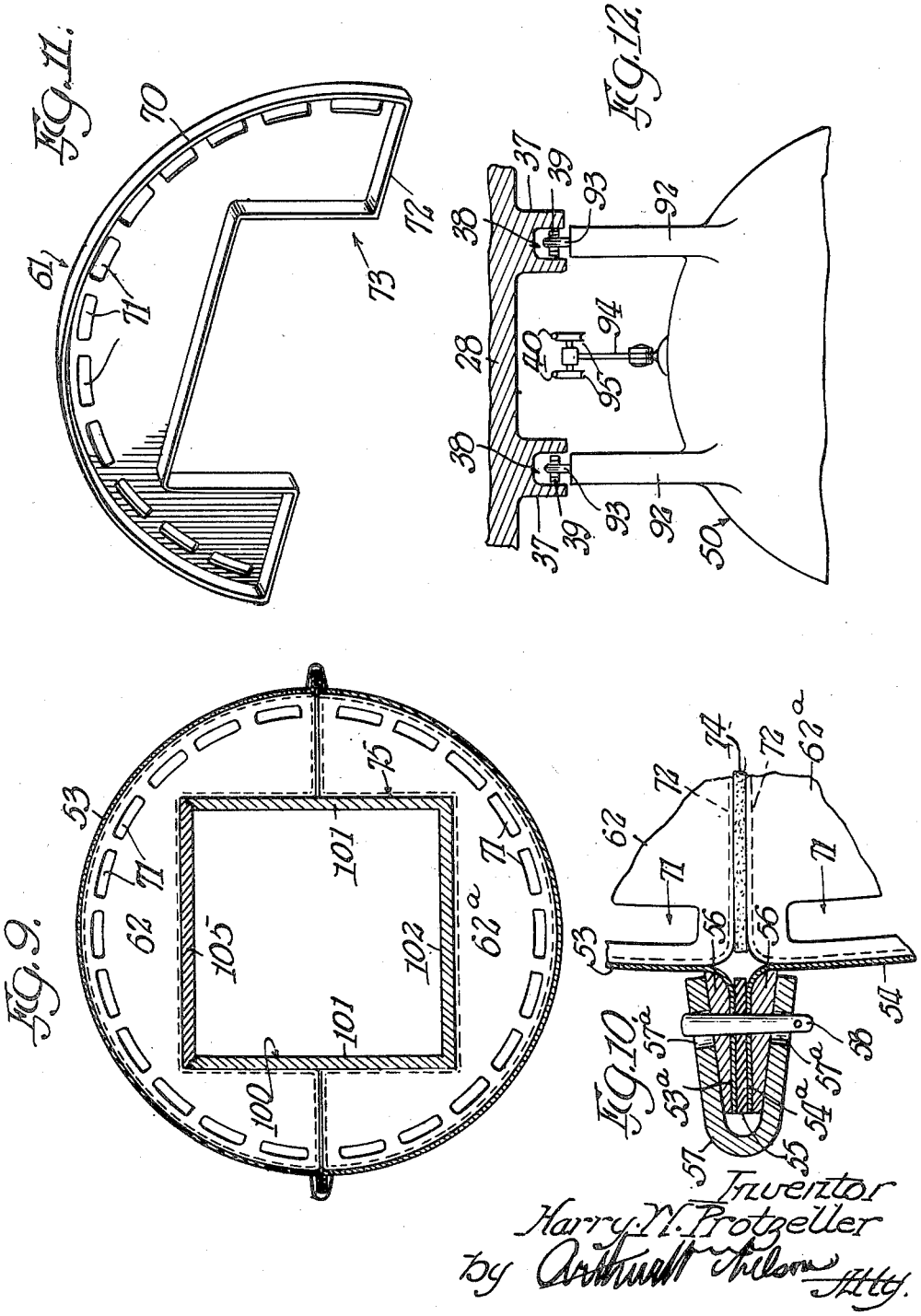

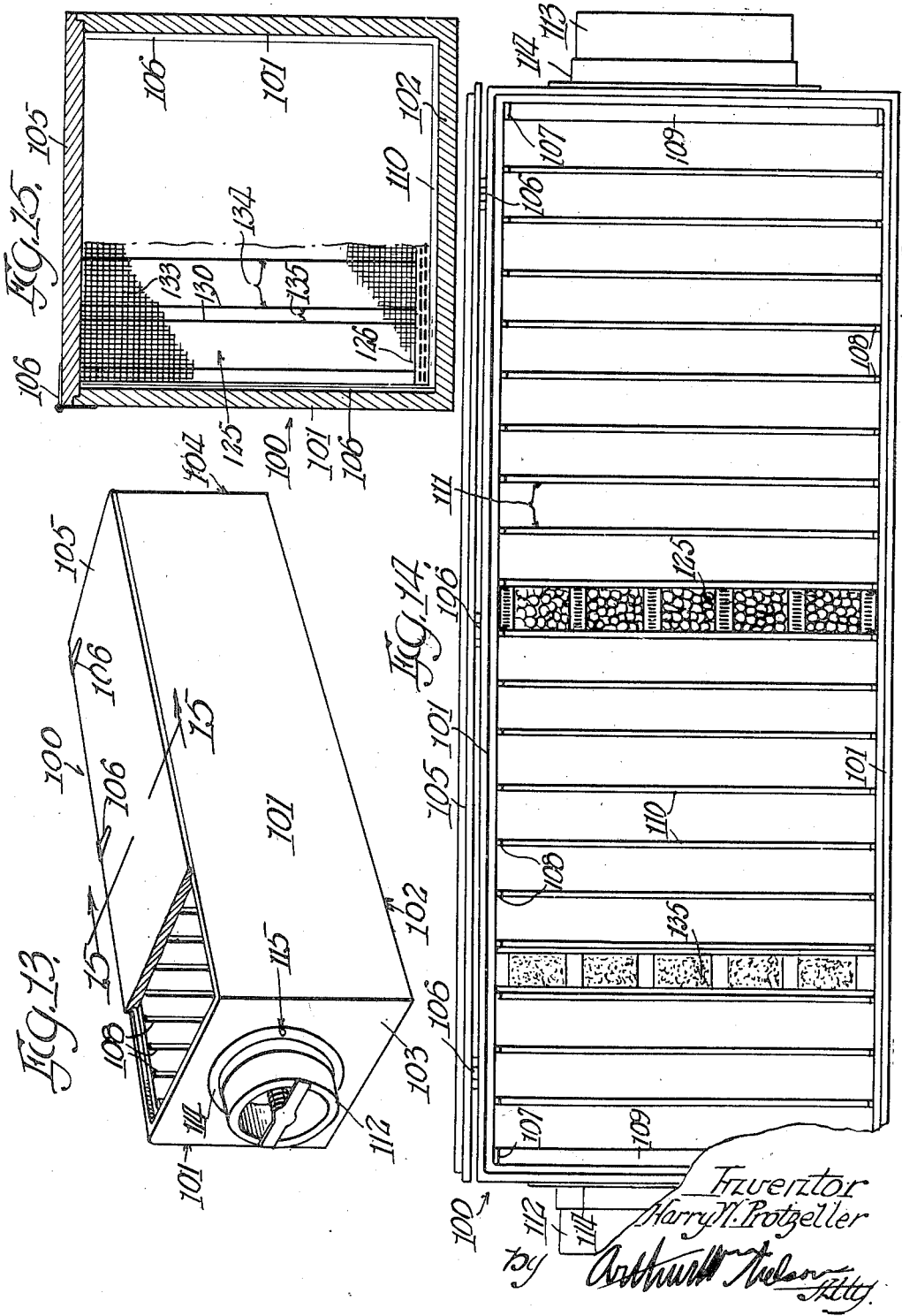

Nov. 1, 1949     H. W. PROTZELLER     2,486,876
APPARATUS FOR AND METHOD OF FREEZING FOOD
Filed Nov. 18, 1943     6 Sheets-Sheet 5
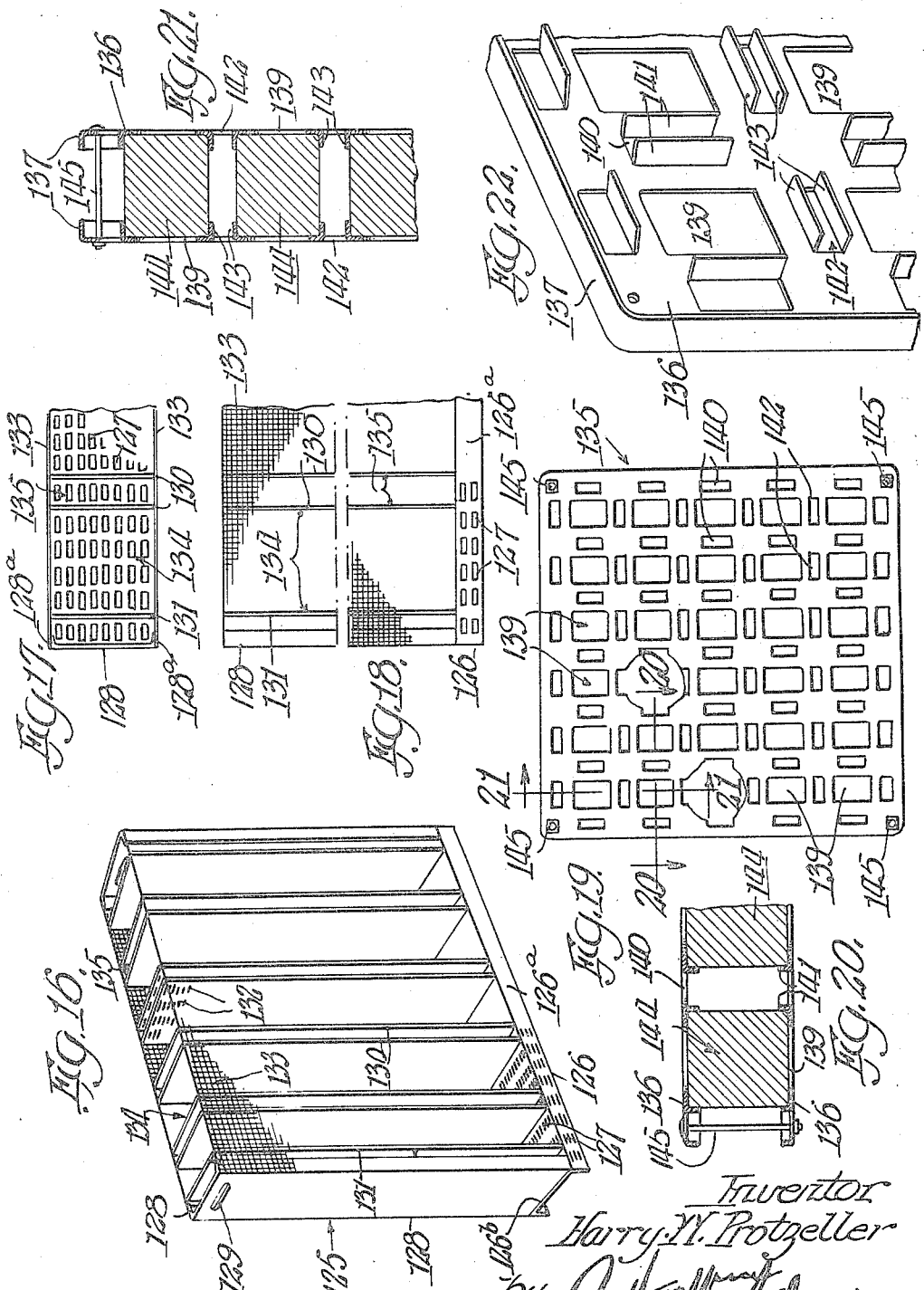
Inventor
Harry W. Protzeller
by Arthur W. Nelson
Atty.

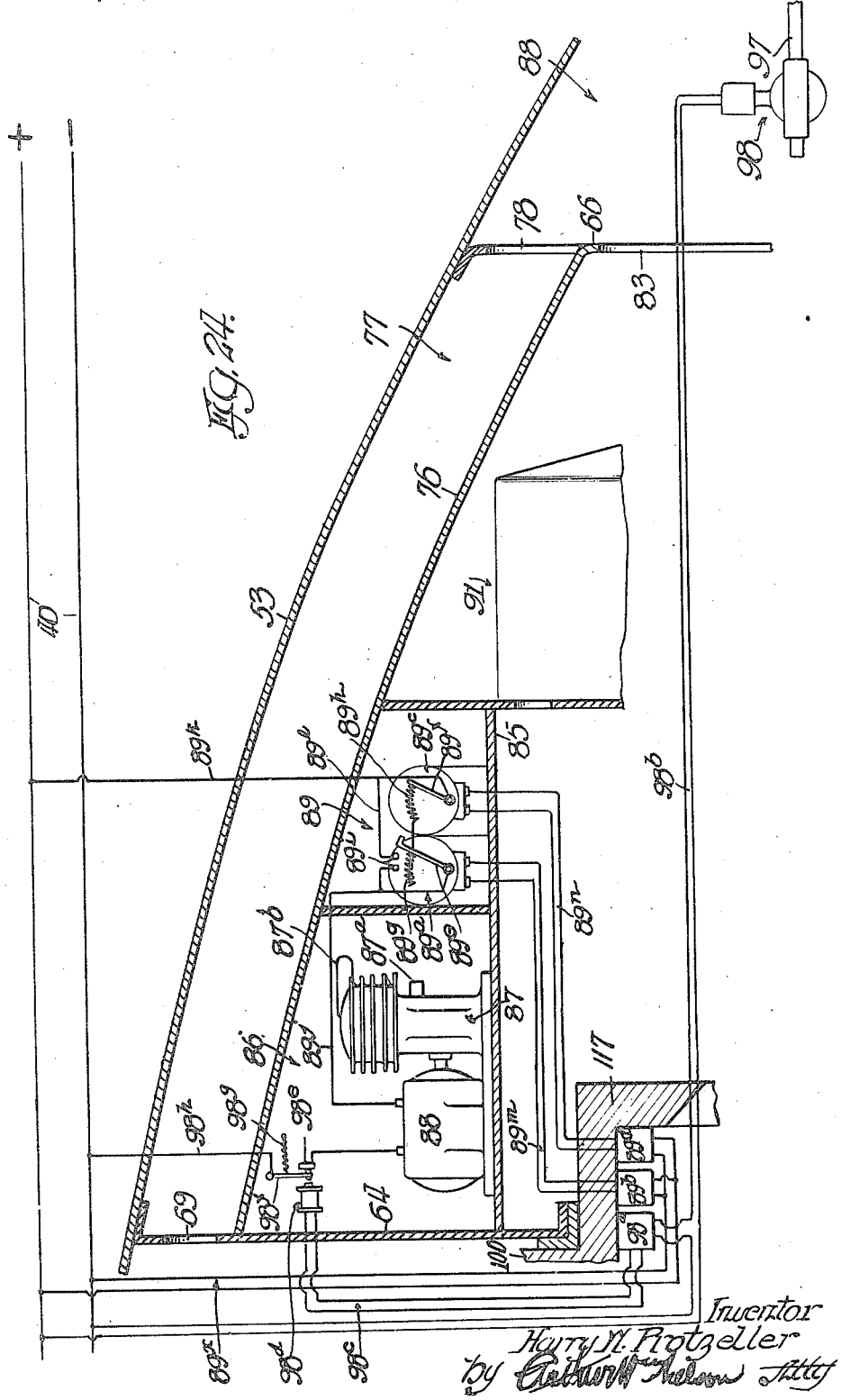

Patented Nov. 1, 1949

2,486,876

UNITED STATES PATENT OFFICE 2,486,876

APPARATUS FOR AND METHOD OF FREEZING FOOD

Harry W. Protzeller, Fairmont, Minn., assignor of one-half to Arthur Wm. Nelson, Park Ridge, Ill.

Application November 18, 1943, Serial No. 510,746

16 Claims. (Cl. 62—6)

This invention relates to refrigerated food products and to means and methods of refrigerating or freezing such food products and it consists of the matters hereinafter described and more particularly pointed out in the appended claims.

Before stating the specific objects and purposes of the present invention, it is believed a general statement relative to methods and apparatus heretofore in use and the nature of the product resulting therefrom, as applicant has analyzed them, will be of aid in understanding the present invention.

*Prior freezing methods*

The freezing systems in commercial use are generally of five types:

(A) still air; (B) forced air; (C) contact; (D) spray method; (E) immersion method.

Most of the products are quick frozen by (A) (B) or (C) and there is considerable difference of opinion whether the product should be packaged before or after freezing.

*Composition of food products*

Food products generally preserved by any of the freezing systems have three main components—solids, liquids, gases, and the liquid component is usually greater in volume and in weight than the other two.

In passing through the thermal process of freezing, each of the three components will react in accordance with the laws of thermodynamics applicable thereto. The gaseous portion will react in volume or pressure changes, these changes being almost directly proportional to the temperature changes throughout the entire temperature range. The solid portion will likewise react in volume changes practically proportional to the temperature changes. But the liquid portion reacts differently. As the temperature is decreased from its initial amount to a point approximately 39 degrees above zero F., there will be a gradual contraction in volume. From 39° to the temperature at which actual change of state from liquid to solid occurs (27° to 32°) there is a slight expansion as the temperature decreases. When the change from liquid to solid occurs there is a marked increase in volume until practically all of the liquid portion has changed state. From there on there is a contraction in volume as the temperature decreases. This peculiar reaction of the liquid portion affects the entire structure of the food particle and creates internal pressures on the gaseous portion. During the freezing process the pressure of the gaseous portion is the only factor that is subject to control over the temperature range. This control may be exercised by varying the external pressure, in the same manner that a ballroom may be inflated by either increasing its internal pressure or by decreasing its external pressure. In the freezing process it is impractical to change the internal pressure of the food particle gaseous portion in any manner except by changing the external pressure of the air surrounding it. By so doing the gaseous portion within the particle will expand the entire particle and thus provide space, internally for the liquid portion to expand into. It is believed that the liquid portion predominately controls the "freshness" of the product and that much of the vitamin and mineral constituents of the product are in solution in the liquid portion and also that much of the coloring and flavoring elements of the product are in the liquid portion, while the odors are in the gaseous portion.

*Losses that occur when foods are frozen under prior systems*

It is generally admitted that there is some loss in flavor and coloring, but the amount is difficult to determine because they are generally left to the organs of sight and taste of the consumer but there is a measurable loss in weight, texture, vitamin and mineral content. Such loss varies with the different systems employed and with the various products being generally greater in the foods of the more delicate structural form such as berries and fruits. In actual commercial practice the weight loss has heretofore run between 6 and 12 per cent of the original product weight.

*Thermodynamic changes during freezing*

There is a definite relation between the temperature, pressure and volume of the product subjected to thermal changes. With solids and liquids the temperature and volume are important factors while in dealing with gases the temperature volume and pressure must all be considered.

Assuming that the volume of the whole particle will be the sum of the individual volumes, the total of one hundred units at different temperatures will be substantially as follows:

| Temperature Fahrenheit | Temperature Absolute | Actual Volume of Entire Particle |
|---|---|---|
|  | *Degrees* | *Units* |
| 70 degrees | 530 | 100.000000 |
| 39 degrees | 499 | 99.483803 |
| 32 degrees Liquid | 492 | 99.430602 |
| 32 degrees Ice | 492 | 106.577490 |
| 0 degrees | 460 | 105.964495 |

Thus the entire particle expands in the change from liquid to ice, due to the peculiar reactions of the liquid portion and if this expansion is allowed to take place normally, as is now the commercial practice, there will be a decided increase in pressure of the gaseous portion. This gaseous pressure increase will cause a substantial displacement of the liquid portion and will force a relatively large portion of the liquids through the external walls or skin of the particle.

Liquids under pressure freeze at a lower temperature than those under less pressure. Thus as the liquids come through the walls of the particle, their pressure decreases and consequently their freezing point rises. This causes those liquids, as they come through the walls to flash into a thin skim of ice on the external walls of the particle. Due to further expansion of the internal liquids, in the progress of their change of state, the walls of the particle are again disturbed which cause the loosening of the first thin skim of ice, which falls off resulting in a substantial loss in weight, especially as this process continues until the entire particle is completely frozen. As the fluid thus lost contains much of the vital constituents of the product, the loss in weight is much more serious than the percentage loss might indicate.

Dehydration of the product

In those freezing systems where air comes into contact with the product being frozen there are additional losses due to dehydration of the product. These losses are less in systems freezing in packages than where the product is frozen loose or in bulk. Dehydration losses are due to the fact that as air is heated its capacity for holding more water vapor is increased. Thus if a large differential exists between the temperature of the air entering the freezing chamber and the air leaving said chamber, the capacity of the air to absorb moisture from the product is large. Also the capacity of air for absorbing heat units is dependent upon the temperature differential between the cold air and the heated product. In present commercial systems using air as the refrigerating medium, it has been the practice to use very low temperature air. As this low temperature air contacts the heated product at the beginning of the process, great quantities of heat units are quickly absorbed, causing a high differential between the temperature of the air entering and leaving, thus resulting in a large dehydration effect on the product. During the initial stages of the freezing process the dehydration effect is much more critical than during the later stages. If the temperature differential is kept low during these stages the dehydration effect will be much less. This may be accomplished by carrying off the heat of the product by means of larger volumes of air at a higher initial temperature.

Radiation of product heat

In systems using cold air as the refrigerating medium, it is necessary to move large volumes of cold air, at high velocities, past the product in order to shorten the time period of contact. Thus whether the product be packaged or loose, such high velocities cause several undesirable results: (A) When the cold air flows by the product at high velocity, a great turbulence is created immediately adjacent the surface of the product which substantially reduces the effective heat radiation surface of the product and interferes with the entire heat flow. This dissipation of energy is in the form of heat that raises the temperature of the air without creating any refrigerating effect. Such dissipation of energy also increases the power requirements. (B) High velocities require large energy input so that such high velocities increase the overall cost of the freezing process.

In the refrigerating process more than seventy percent of the total heat transfer is due to the latent heat of fusion of the product, which occurs at approximately 27° to 32° F. In this range the dehydration effect is much less than at higher temperatures. Thus if the temperature of the air actually coming into contact with the product could be changed, as desired, so that a relatively low temperature differential would exist at the critical dehydration range and a higher differential at the non-critical range, the overall efficiency of the system would be increased and the dehydration losses reduced. Due to the requirements of commercial forced air systems for freezing heretofore used, however, this has not been found feasible.

One of the objects of the invention is to provide a method of freezing food products whereby the "freshness" of the product may be maintained to a greater extent than has been possible with methods heretofore devised.

Another object of the invention is to provide a method of freezing food products wherewith the loss in weight may be greatly reduced.

Again, it is an object of the invention to provide a method of freezing food products wherewith dehydration losses may be greatly reduced, if not entirely prevented.

It is also an object of the invention to provide a method of freezing food products which will retain in the food particles the essential constituents responsible for the color, flavor, texture, vitamin and mineral content of the particles so as to preserve the food product for future use in substantially the condition obtaining in its natural state at the time of processing.

Other objects of the invention are to provide means whereby the above mentioned objects and others, which will appear hereinafter, may be attained and generally to provide improved means for the continuous production of frozen food products on a large and economical scale.

In the drawings:

Fig. 1 is a perspective view of one form of freezing chamber that may be advantageously employed in carrying out the improved method of refrigerating products according to one embodiment of the invention.

Fig. 2 is a transverse vertical sectional view through a mid portion of the freezing chamber shown in Fig. 1, on the line 2—2 of Fig. 1, but on a scale enlarged relative thereto.

Fig. 3 is a longitudinal horizontal sectional view through the chamber shown in Fig. 1 as taken on the line 3—3 and on a scale somewhat reduced from that of Fig. 2.

Fig. 4 is a view in end elevation of the chamber shown in Fig. 1, on the scale of Fig. 2.

Fig. 5 is a longitudinal vertical detail sectional view through one of the end locks of the freezing chamber as taken on the line 5—5 of Fig. 3, but on the scale of Figs. 2 and 4.

Fig. 6 is a longitudinal vertical sectional view through one form of pressure-temperature chamber assembly that may be advantageously employed in connection with the freezing chamber before mentioned in carrying out the improved method of refrigerating products according to one embodiment of the invention.

Figs. 7, 8 and 9 respectively are transverse vertical sectional views through parts of the chamber assembly shown in Fig. 6 as taken on the lines 7—7, 8—8 and 9—9 respectively of said Fig. 6.

Fig. 10 is an enlarged view of parts appearing at the left hand side of Fig. 9 and more particularly shows a structure by which the meeting margins of the shell parts of the pressure-temperature chamber assembly may be detachably secured together, in a pressuretight manner.

Fig. 11 is a perspective view of one of a plurality of archlike plates forming a part of the pressure-temperature chamber assembly of Fig. 6 and which will be more fully referred to later.

Fig. 12 is a view partly in end elevation and partly in transverse vertical section of parts associated with the before mentioned pressure-temperature chamber assembly and freezing chamber respectively.

Fig. 13 is a perspective view of a product container adapted to be disposed in the pressure-temperature chamber assembly of Fig. 6 and in which referigeration of the product operated upon takes place, a part of the cover of the container appearing as broken away better to show the interior construction thereof.

Fig. 14 is a top plan view of the container appearing in Fig. 13, on a scale enlarged with respect thereto with the cover shown in its open position.

Fig. 15 is a transverse vertical sectional view through the container of Fig. 13 as taken on the line 15—15 thereof and on the scale of Fig. 14.

Fig. 16 is a schematic perspective view of one of a number of loose product carriers, adapted to be disposed in the container of Fig. 13 and in which the actual refrigeration of the product takes place, the carrier including a number of foraminous sheets or plates in its make up and in which figure for the sake of clarity only, a few of the openings in said plates appear.

Fig. 17 is a top plan view of one end of the loose product container appearing in Fig. 16.

Fig. 18 is a view in side elevation of one end of the container appearing in Fig. 17.

Fig. 19 is a view in side elevation of one of a plurality of package carriers adapted to be disposed in the product container of Fig. 13 and in which the products, in package form, may be refrigerated.

Fig. 20 is a horizontal detail sectional view through the product package carrier of Fig. 19 as taken on the line 20—20 and on a scale enlarged over that of Fig. 19.

Fig. 21 is a vertical detail sectional view through the product package carrier of Fig. 19 as taken on the line 21—21 thereof, on the scale of Fig. 20.

Fig. 22 is a fragmentary perspective view of one of a pair of counterpart plates embodied in the product package carrier of Fig. 19, when said plate is viewed toward its inner surface and on a scale enlarged relative to Fig. 19.

Fig. 23 is a cross sectional view through one of a number of evaporating tubes employed in the freezing or refrigerating chamber of Fig. 1 and which will be more fully referred to later.

Fig. 24 is a fragmentary view, on an enlarged scale, of certain parts appearing in Fig. 6, made to diagrammatically illustrate the operational relationship and connection between a certain vacuum pump, automatic pressure and temperature control and pressure relief valve, embodied in the invention herein and which will be more fully described later.

The apparatus illustrated in the drawings, for carrying out the improved method of refrigerating products, such as used for human consumption, includes primarily a freezing chamber, a pressure-temperature chamber assembly adapted for movement through the freezing chamber, a product container adapted to be removably disposed in and carried by the pressure-temperature chamber assembly and a plurality of product carriers adapted to be removably disposed in spaced relation in the product container. The product carriers are preferably of two kinds, one for carrying the products in package form and the other for carrying the products in loose or bulk form.

In general the freezing chamber is in the form of a relatively long tunnel and has an entry lock at one end and an exit lock at the other end. By means of said locks, a plurality of sealed pressure temperature chamber assemblies may be suitably conveyed, in procession, into, through and out of the freezing chamber with a minimum loss of refrigeration in the freezing chamber. Also, in this manner moisture may be prevented from entering that part of the tunnel in which freezing is accomplished.

Each pressure-temperature chamber assembly as shown has a smooth surfaced, aerodynamic contour or shape, and comprises top and bottom halves or shells. Said halves or shells, each include a thin sheet metal covering or "skin" for the quick conduction of heat units therethrough, braced internally for strength and so matched at their meeting margins as to be sealed pressuretight within the necessary working limits. Each chamber assembly also includes means whereby the pressure of the gaseous-like atmosphere (generally air) within the same can be regulated in accordance with the temperature of said atmosphere, as well as means whereby said atmosphere may be recirculated through the products packed in carriers removably disposed in the product container.

The product carriers are preferably of such size as to be conveniently handled when loaded. The carriers and containers are so coordinated that the carriers are held in spaced relation within the container and each carrier is so formed as to permit the circulation of the gaseous-like atmosphere through and about the products therein. The gaseous-like atmosphere within the pressure-temperature chamber assembly is caused to move into one end of the product container and over, about and between the products in the carriers therein to absorb heat units therefrom and then pass out the other end of the product container. The internal structure of the pressure-temperature chamber assembly is such that said gaseous-like atmosphere after leaving the last mentioned end of the product container is directed back toward the first mentioned end, while in contact with the internal surface of the thin metal skin of the pressure-temperature chamber assembly. Hence the skin conducts said heat units and passes them off to the low temperature atmosphere surrounding the chamber when the latter is in the freezing chamber.

*The freezing chamber*

The freezing chamber is indicated as a whole in Figs. 1 and 3 as at 25. It is in the form of a relatively long tunnel-like body having an entry lock 26 at one end and an exit lock chamber 27 at the other end. The term "lock" as used herein is intended to mean an enclosure between two gates or doors and whereby such enclosure may be isolated from or brought into operative communication with the interior of the body of the freezing chamber.

The body of the freezing chamber 25, which is here shown as of rectangular cross section, is wider than it is high and it includes a top wall 28, a bottom wall 29, side walls 30—30 and end walls 31 and 32 respectively, made of good heat insulating material. The body of the freezing chamber also includes laterally spaced, longitudinal partitions 33—33, each of which terminates at its ends in spaced relation from the associated end walls 31—32. These partitions divide the interior of the chamber body into two side passages 34—34 and a wider central passage 35 as best appears in Figs. 2 and 3. The internal surfaces of the end walls 31—32, in line with the passages 34—34 are rounded as at 36, as best appears in Fig. 3, for a purpose later to appear.

Depending from the top wall 28 are laterally spaced longitudinal ribs 37—37 (see Figs. 2 and 12) each with a downwardly facing groove 38 therein and which ribs extend to the ends of the locks 26 and 27 respectively. These grooves accommodate a variable speed chain conveyor 39—39 divided into three parts. The first part takes the pressure temperature chamber assembly, later to be described, through the entry lock 26 into the freezing zone in the chamber body 25, at a rapid rate of speed. The second part moves said assembly through the freezing zone at preferably a slower rate of speed, and the third part takes said assembly through the exit lock 27 at a rate of speed substantially the same as through the entry lock 26.

Extending longitudinally through the freezing chamber and disposed between the conveyor chains 39—39 is a pair of current conductors 40—40 whereby certain mechanisms in the before mentioned pressure temperature chamber assembly receives power for actuation of contained mechanism. The parts just above mentioned best appear in Figs. 6 and 12 respectively.

In the mid portion of each side passage 34 of the freezing chamber is located an expansion element or unit 41—41 (see Figs. 2 and 3) which is suitably connected to a refrigerating apparatus (not shown) located outside the freezing chamber. Each element is herein shown as consisting of a plurality of banks of upright tubes 42 and top and bottom headers 43—43, the tubes in each bank being spaced apart laterally for the passage of air between them.

Each tube 42 has a streamline cross sectional shape as appears in Fig. 23 with the rounded end 42a thereof facing the entry lock end of the freezing chamber and with the pointed end 42b thereof facing the exit lock end of said chamber. With the tubes 42 having the cross section above mentioned, a minimum of resistance to air flow between said tubes and a maximum of effective evaporating surface for each tube is afforded.

Also located in each passage 34 and spaced from the ends of the expansion elements therein are air moving means each of which consists of a fan 44 and a driving motor 44a therefor, as best appears in Figs. 3 and 4.

The locks 26 and 27 are in line with and of substantially the same width as the center passage 35 of the freezing chamber but of a length somewhat greater than that of one of the pressure temperature chamber assemblies before mentioned. The entry lock has an inlet opening 26a at one end and an outlet opening 26b at the other end which communicates with the interior of the associated end of the freezing chamber. Associated with the openings 26a—26b are bottom hinged doors 26c and 26d respectively whereby said openings may be covered or closed and uncovered or opened as desired. Preferably each door opens toward the associated end of the freezing chamber and is actuated by an electric motor 45 as shown in Fig. 5. In the lock 26 near the opening 26b are foraminous cages 46 containing a hygroscopic material for absorbing moisture from the atmosphere within the lock. Other means may be provided to absorb or remove moisture in the locks so as to prevent moisture finding its way into the freezing chamber or tunnel.

The lock 27 has an inlet opening 27a at one end that communicates with the associated end of the freezing chamber and an outlet opening that communicates with atmosphere, and associated with said openings are bottom hinged doors 27c and 27d respectively. These doors open toward the associated end of the freezing chamber and each is also actuated by an electric motor 45. In the lock 27 as in the lock 26 are foraminous cages 46 to contain hygroscopic material to absorb moisture from the atmosphere within the lock.

When the refrigerating apparatus, to which the expansion elements 41 are connected and the motors 44a are in operation, the gaseous-like atmosphere, such as air, within the freezing chamber, is caused to move in each passage 34 toward the exit end thereof, being cooled by the elements 41 en route. At said end the moving columns of air engage the curved surface 36 of the associated end wall 32 and are deflected thereby into the associated end of the center passage 35. When such gaseous-like atmosphere leaves said end of the passage 35, it engages the curved surfaces 36 of the associated end wall 31 to be deflected thereby back into the associated end of the passages 34 for recirculation through the passages 34 and 35 of the freezing chamber in the directions mentioned.

When the freezing chamber is in operation, only one door of each lock 26—27 is open at one time so that the interior of the freezing chamber is never in direct communication with outside atmosphere.

The sealed pressure temperature chamber assembly

Each pressure temperature chamber assembly, indicated as a whole as at 50, is in the form of a streamline hollow thin walled body having a rounded or partly spherical leading end 51 and a somewhat pointed trailing end 52. The assembly has its greatest diameter at about its mid portion and then gradually tapers toward said ends.

Preferably the body is made of top and bottom separable shells 53 and 54 respectively of thin sheet material, such as metal having good heat conducting properties. Said shells have matched horizontal meeting edges, each formed as an outwardly extending flange 53a—54a which best appear on an enlarged scale in Fig. 10. It is desired that when the shells are in body forming engagement, the joint or engagement between these flanges 53a—54a be sealed substantially pressure-tight. Therefore a compressible gasket strip 55 is placed between the flanges 53a—54a and on the outer face of each flange is provided a tapered wedge strip 56. These wedge strips provide a seating engagement for an enclosing strip 57 of substantially a U-shaped cross section, preferably made in sections instead of one continuous length. Said strips have openings 57a—57a in the flanges thereof which match up with holes provided in the flanges 53a—54a, the gasket strip 55 and the wedge strips 56—56. A taper pin 58 is removably driven through the openings and holes just above mentioned into a position compressing the gasket strip 55 to afford a good tight seal about the flanges 53a—54a. This arrangement of parts best appears in Fig. 10. By driving the pins 58 out through said openings and holes, from their bottom ends, the shells 53 and 54 may be separated.

The shell parts 53—54 are each provided with a plurality of longitudinally spaced arched-like plates indicated by the numerals 60—60a, 61—61a, 62—62a, 63—63a, 64—64a, 65—65a and 66—66a respectively beginning at the advancing (left hand) end of the assembly 50 and proceeding toward the trailing (right hand) thereof as shown in Fig. 6.

Spaced forwardly of the plate 61 of the shell part 53 is a load carrying member 61x and spaced rearwardly from the plate 63 is a second load carrying member 63x, similar to the plates 61—62—63 and 64 respectively. For a better showing of these plates, one of them, bearing the numeral 61, appears in perspective in Fig. 11.

Each of the plates 60—60a and 64—64a has an outer semi-circular peripheral flange 67—68 and an inner circular flange 67a and 68a respectively. The outer flanges engage with and are fixed to the internal surface of the shell parts 53 and 54 respectively while the flanges 67a and 68a coact to provide an opening arranged centrally of the pressure temperature chamber as a whole. The openings just above mentioned are adapted to receive certain parts of a product container, described later. Each plate above mentioned is formed near its periphery with elongated openings 69.

The plates 61—61a—61x, 62—62a and 63—63a—63x are structural counterparts and differ only in dimensional characteristics and one of said plates, namely the plate 61, is shown in perspective in Fig. 11. Each plate includes a semicircular peripheral flange 70 that is engaged with and is fixed as by spot welding to the internal surface of the associated shell parts 53—54. Adjacent the flange 70 of each plate are openings 71 similar to the openings 69 before referred to. Each plate is formed with a second flange 72 that bounds a rectangular recess 73 therein as shown in Fig. 11. The recess 73 is about twice as wide as it is deep (vertically).

When the shell parts 53 and 54 are secured together, to form the pressure temperature chamber, a compressible gasket 74 is interposed between parts of the flanges 72 and associated plates as appears in Fig. 10. At this time the recesses 73 of associated shell parts coact to provide a square opening 75 as shown in Fig. 9.

Spaced inwardly from each shell 53—54 and extending between the plates 64—66 and 64a—66a is a semicircular wall 76 that coacts with said shell parts in forming an annular passage 77 at this point as best shown in Figs. 6 and 8 respectively. The front end of this annular passage registers with the opening 69 in the plate parts 64—64a while the rear end of said passage registers with openings 78 in the periphery of the plate parts 66—66a and thus communicates with a compartment 80 in the rear end of the temperature pressure chamber assembly when the shell parts 53—54 are operatively secured together as before described.

The plate parts 65—65a divide the space between the plate parts 64—64a and 66—66a into compartments 81 and 82 respectively as best appears in Fig. 6. An opening 83 is formed in the wall parts 66—66a that affords communication between the compartments 80—82 and openings 84 in the plate parts 65—65a afford communication between the compartments 81—82.

In the upper part of the compartment 81 is a horizontal partition 85 above which is a space 86 in which is located a vacuum pump 87 that is driven by an electric motor 88. Also in said space is located automatic pressure temperature controls that are indicated diagrammatically at 89.

The plate part 65 functions as a support for a variable speed electric motor 90 that is located in the compartment 81. This motor drives a turbocompressor 91 located in the compartment 82 and the purpose of said compressor will later appear.

The shell part 53 is provided with two pairs of upright hangers 92—92 of streamlined cross section with each hanger carrying a top end hook 93 adapted to be detachably engaged with parts of the conveyor chains 39 in the freezing chamber 25. Said shell part is also provided, at a point centrally between the hangers 92—92, with a trolley pole 94 having top end wheels 95—95 for a power take-off engagement with the conductors 40—40. Thus when the assembly 50 as a whole is being moved through the freezing chamber 25 by means of the chains 39—39, the trolley wheels and pole supply current to the motors 88 and 90 as well as to the pressure temperature control 89.

97 (see Fig. 6) indicates a pressure relief and control to be arranged longitudinally in the chamber 80 and opening at one end through the shell part 53 to atmosphere. This tube is provided within the chamber 80 with an electromagnetic valve 98 which is controlled by an electrothermal device (not shown) located in the interior of a food product container soon to be described.

It is pointed out that the shell part 53 is the weight supporting member of the pressure-temperature chamber assembly as a whole and that the shell part 54 functions merely as a bottom closure therefor when the product container, soon to be described, is arranged in operative position in the assembly.

*Food product container*

The food product container, which is indicated as a whole by the numeral 100, is best shown in Figs. 13, 14 and 15 respectively. It is in the form of a generally elongated, rectangular box made of light weight, non-metallic heat insulating material such as wood, which if desired may be of laminated form to provide adequate strength. It has a length approximating the distance between the pairs of walls 60—60a and 64—64a of the pressure-temperature assembly 50 and has a square cross section so that it fits in the squared openings 75 before mentioned.

The product container includes an open top body comprising side walls 101—101, a bottom 102 and end walls 103 and 104 respectively, preferably made of wood. The side and end walls are rabbeted about their top edges to receive a cover 105. This cover has a hinged connection 106 along one edge with the top edge of one of the side walls. Thus the cover may be swung from a closed to an open position for the body.

On the inner surface of the side walls 101—101 are upright, longitudinally spaced end and intermediate strips 107 and 108 respectively, the end strips being wider than the intermediate ones. On the inner surfaces of the bottom wall, in line with the strips on the side walls, are other and matching strips 109 and 110 respectively. As best shown in Fig. 14, said strips divide the interior of the product container into a plurality of separated spaces 111 (as best appears in Fig. 14), each space 111 being adapted to receive and hold a product carrier later to be described so that when loaded with such carriers there is a space between the adjacent carriers as wide as the intermediate strips above mentioned.

The end walls 103 and 104 are each formed with a centrally arranged outwardly extending tubular projection 112 and 113 respectively, each surrounded near the associated end wall with an angle bar ring 114 whereby a good strong structure is afforded at this point. The horizontal flange of each ring 114 is adapted to fit within the circular openings afforded by the meeting edges of the plates 60—60a and 64—64a of the pressure temperature container 50 before mentioned. The vertical flange of each ring is provided with threaded openings 115 (only one of which appears in Fig. 13) which are so disposed as to register with openings 60x in the plate parts 60 and 64 before mentioned. Only the openings 60x appear in the drawings in Fig. 7.

In the end walls 103 is a valve seat 103a to accommodate a normally closed spring pressed valve 116 that opens outwardly from said end wall when pressure conditions in the product container are such as to overcome and cause the same to open. The tubular extension 113 is provided with an end wall 117 (see Fig. 6) in which is formed a valve seat 118 to accommodate a normally closed spring pressed valve 119 that opens inwardly of the tubular extension when the pressure conditions in the compartment 81 of the chamber assembly 50 are such as to cause the same to open.

When the product container 100 is disposed within the pressure temperature chamber assembly 50, bolts 120 (see Fig. 7) are inserted through the openings 60x in the plates 60—64 to enter the opening 115 in the rings 114 so as to hold the product container 100 in position in said assembly. These bolts, of course, are applied before the shell part 54 is attached to the shell part 53, in the loading of a product container in the assembly 50. Conversely in unloading the assembly 50, the bolts 120 are removed after the shell part 54 has been detached from the shell part 53.

Product carriers

As before mentioned, the product container 100 is adapted to receive and hold carriers for the food products and in this instance the carriers are of the same size, they are of two kinds, one for holding the products in bulk or loose form and the other for holding the products in package form. In both instances, the carriers are so formed as to permit a circulation of air about and through the same and such carriers are hereinafter referred to as the "bulk" or "loose" carriers and "package" carriers respectively.

Bulk or loose carrier

Each bulk or loose carrier, which is indicated as a whole at 125 and is best shown in Figs. 16, 17 and 18, is of such a size and shape as to fit into one of the spaces 111 of the product container 100. Each includes a bottom 126 in the form of a channel with downwardly extending flanges 126a and a top web 126b and which flanges and web have perforations 127 therethrough. Rising from each end of the channel bottom 126 is an upright channel 128 having its flanges 128a directed inwardly. At the top end of each end channel is a hand hold opening 129. Also rising from the channel bottom are upright partitions 130—131 respectively, each having perforations 132 therein as indicated in Fig. 16. For the sake of clarity, the perforations 132 have been illustrated in only part of the plates and partitions, but it will be understood they are provided throughout. The partitions 130 are arranged in rather closely spaced pairs and the partitions 131 are arranged adjacent the associated end channels. A foraminous sheet 133, such as a relatively heavy screen, is applied to the various channels and partitions. Thus pockets 134 and spaces 135 respectively are provided in the carrier, the former being the wider and adapted to receive the bulk or loose food products and the latter being air spaces only. With the structure described, the products disposed in the pockets 134 are relatively open at the sides, front and rear and at the bottom for a circulation of air therethrough.

The package carrier

The package carrier, which is indicated as a whole at 135 and is best shown in Figs. 19, 20, 21 and 22, is also of the shape and size to fit into one of the spaces 111 in the product container 100.

Each carrier embodies therein two sides in the form of thin sheet metal stamped out counterpart plates 136—136, a part of one of which is best shown in perspective in Fig. 22. Each plate 136, which has the same area as the loose product carrier 125, has an inturned flange 137 bounding its margin. In said plate are vertical and horizontal rows of rather large, rectangular openings 139 which, as shown herein, have a greater vertical than horizontal dimension. Between each two adjacent openings 139 in the horizontal rows thereof are vertically elongated smaller openings 140 formed at the sides by inwardly extending lips or flanges 141—141. Between each two adjacent openings 139 in the vertical rows thereof are formed horizontally elongated openings 142 defined at the top and bottom by inwardly extending lips or flanges 143—143.

With the arrangement described, there is a lip or flange 143 spaced above and below each opening 139 and a lip or flange 141 spaced to each side of each opening 139 and these lips serve as supports to confine a food product package 144 (see Figs. 20 and 21) when two of the plates 136—136 are disposed in spaced relation to support the package in spaced apart manner. The plates 136 with the packages 144 between them are detachably secured together by means of corner bolts and nuts 145. With the arrangement described, each package 144 is spaced on all sides from its neighbor and the greatest part of its opposed ends are exposed by the openings 139. Thus there are vertical and horizontal passageways between the packages in the plane of the edges of the carrier as a whole, and these passages are in communication with the openings 140 and 142 in the plates 136. Therefore, a universal circulation is afforded about, between and over the packages 144 held in each carrier. As the product carriers 125 and 135 are of the same shape and size it is apparent that both types of carriers may be contained in the product container because each fits within the spaces 111 of the product container 100. Thus the product container may be packed entirely with the carriers 125 or with the carriers 135 or some of both may be placed in the container 100 as appears in Fig. 14.

*Operation*

In the operation of the parts described, filled product carriers 125 or 135 are disposed, one in each of the spaces 111 of the product container 100 from its open top, after which the lid or cover 105 is swung into its closed position. It is apparent that the carriers (125 or 135 as the case may be) are disposed in spaced relation with wider spaces between the endmost carriers and the end walls 103—104 of the container.

The next step is to load the container 100 into the pressure temperature chamber assembly 50. This is accomplished when the shell member 54 is detached from the shell member 53 which is therefore open at its bottom. The loaded container is now raised into position in the shell part 53 and when properly fitted therein, the bolts 120 are inserted through the openings 60x in the plates 60 and 64 and into the openings 115 of the rings 114 at the ends of the product container 100. The product container is thus secured in position in the shell part 53 so that said shell part supports the entire weight of the product container.

The next step is to apply the shell part 54 to the shell part 53 so that the former forms a bottom closure for the latter. After the flanges 53a—54a of the shell parts 53—54 have been brought into register or matching relation with the gasket strip 55 between them, the sections of the U-shaped strips 57 are applied to said flanges and the pins 58 driven through the registering holes in said strips and flanges from above. This draws the strips 57 inwardly of the wedge strips 56—56 and draws and compresses the parts together so that a good tight seal is afforded between the flanges 53a—54a of the shell parts 53—54.

The pressure temperature chamber assembly is now ready to be passed through the freezing chamber. The hooks 93 on the hangers 92 of said assembly are at this time operatively engaged with those parts of the conveyor chains 39 outwardly of the entry lock 26 of the freezing chamber. As the pressure temperature chamber assembly approaches the inlet opening 26a of the entry lock 26, it functions (through control means not shown) to energize the motor 45 associated with the door 26c to open the same so that said assembly enters said lock. The door 26c automatically closes and the door 26d automatically opens so that the assembly 50 enters the interior of one end of the center passage 35 of the freezing chamber and moves toward the other end of said passage. It is to be noted from the arrows on Fig. 3 that the assembly 50 moves in a direction opposite to that of the recirculated gaseous-like atmosphere (usually air) in the freezing chamber.

Suitable means are provided so that as the pressure temperature control assembly 50 enters the passage 35, the motor 90 becomes energized to drive the turbocompressor 91. This builds up a pressure in the chamber 81 sufficient to cause the valve 119 to open inwardly of the product container 100 and leave its seat 118 so that the gaseous atmosphere enters said container and passes through the same and through, about and between the loaded carriers 125—135 therein. The pressure in said container soon builds up to one which causes the valve member 116 to leave its seat 103a and move to an open position so that the gaseous atmosphere enters the compartment at the front end of the pressure temperature chamber assembly.

It is pointed out at this time, that the spaces in the product container 100 as formed by the wider strips 107—109, are wider than the spaces between the carriers 125—135 as the case may be and these wider spaces function as collecting and distributing compartments to provide an even distribution of the air flow through the product container and its contained carriers.

By reason of the rounded front end of the sealed pressure temperature chamber assembly 50, the gaseous atmosphere in the front end of the chamber is reversed in direction to follow the contour of the adjacent portions of the shell parts 53—54 to pass successively through the openings 69—69 in the arch plates 60—60a, openings 71 in the plates 61—61a, 62—62a, 63—63a and openings 69—69 in the arch plates 64—64a into the front end of the annular passage 77 and then out of the rear end thereof into the rear end chamber 80. From this chamber the moving column of gaseous atmosphere passes through the opening 83 into the chamber 82 for reentrance into the turbocompressor for recirculation in the path mentioned.

This path of recirculation is best shown by the arrows in Fig. 6 and wherein the carriers 125 or 135 have been omitted from the product chamber better to show said path of recirculation.

In the passage or movement of the gaseous-like atmosphere through the container 100, it absorbs heat units from the products in the carriers in said container. As the gaseous-like atmosphere, in its rearward movement, intimately contacts the internal surface of the thin and now cold metallic skin of the shell parts 53—54, it absorbs and dissipates said heat units to the low temperature of the circulating air in the freezing chamber.

As the pressure temperature chamber assembly 50 approaches the door 27c of the exit lock 27, it causes the motor 45 for said door to open the same so that said assembly enters said lock. When said assembly is in said lock, the door 27c closes and the door 27d of said lock opens so that said assembly passes out of the lock and is ready for unloading, should this be desired at this time.

The member 91, which is a turbocompressor, is much preferred over an ordinary blower or air moving fan for the following reasons. It is desirable to have a constant weight of air going through the circulating system. To accomplish this the static pressure of the air discharged by the turbocompressor must be fairly constant. This means that the characteristics of the compressor must be accommodated to the condition of the gaseous atmosphere is handles or operates upon. A turbocompressor of this type will increase the discharge pressure as the temperature of the gaseous-like air decreases, provided that the speed is constant. Offsetting this feature, as the air pressure and relative density decreases, the discharge pressure will decrease in proportion to the density decrease.

The function of the vacuum pump 87 before mentioned is to reduce the air pressure within the pressure temperature chamber assembly 50 in accordance with a predetermined temperature pressure ratio. The air exhausted from the pump is delivered to atmosphere external to the assembly 50 by an outlet 87b shown in Fig. 24. A remote control valve 98 is located in the rear end chamber 80 of the assembly connected to a tube 87 whereby air from the atmosphere external to the assembly 50 may be passed into said chamber as required to increase the pressure after the creation of a partial vacuum by the pump.

The function of the pressure temperature controls 89 is to regulate the pressure of the internal gaseous-like atmosphere in the assembly 50 in accordance with a predetermined ratio. One of the devices of this control starts and stops the pump 87. The temperature responsive element operating this device of the control is located within the product container 100 so that the temperature of the product operated upon is the governing factor. The other device of said control devices functions to increase the speed of the motor 88 which drives the vacuum pump as the pressure within the chamber 50 decreases. The pressure responsive element operating this device of the control is also located in the container 100 so that the pressure therein is the governing factor. The third device is a temperature responsive element that cuts off the vacuum pump 87 and opens the relief valve 98 before mentioned when the product has reached its final predetermined temperature. This last mentioned element is also located in the container 100. When said valve 98 is open the air pressure within and without the assembly 50 is equalized.

In Fig. 24 there is illustrated diagrammatically the operational relationship and connection between certain of the parts previously mentioned, such as the vacuum pump 87 and its motor 88, the pressure temperature controls 89 and the pressure relief valve 98.

The magnetic valve 98 is a standard form of solenoid magnet valve. It is normally closed when not energized, and is opened when energized. Its opening operation is controlled by a thermostat 98ª located in the container 100 (see Fig. 24). Said thermostat is operatively connected to a pair of conductors 98ᵇ receiving energy from the current conductors by a trolley, later mentioned. The thermostat 98ª is also connected by a pair of conductors 98ᶜ with the coil 98ᵈ of a relay switch that includes a fixed contact 98ᵉ and a movable contact 98ᶠ. The contacts 98ᵉ and 98ᶠ are normally held engaged by a spring 98ᵍ. When the coil 98ᵈ is energized, it attracts the contact 98ᶠ and separates the same from the contact 98ᵉ and opens the circuit in which they are disposed. The contacts are operatively disposed in a line 98ʰ that connects one side of the vacuum pump motor 88 with the negative line of the said conductors 40—40. The thermostat 98ª may be any of the well known types that may be set to function at the desired low temperature and which, in this one, is the one present in the container after a freezing of the products therein.

The pressure temperature control 89 includes a device 89ª that is controlled by an electrothermostat 89ᵇ, and a device 89ᶜ that is controlled by an electropressurestat 89ᵈ, said thermostat and pressurestat also being located in the container 100 so as to be affected by the temperature and the pressure therein. In this respect the device 89ᵇ is set to operate at a temperature somewhat higher than the temperature for the device 98ª before mentioned.

The devices 89ª and 89ᶜ each include a swinging hand or sweep 89ᵉ and and 89ᶠ respectively which cooperate with resistance elements 89ᵍ and 89ʰ respectively that are connected in series. The device 89ª also includes a pair of spaced contacts 89ⁱ disposed about midway between the ends of the resistance element 89ᵍ.

The hand 89ᵉ is so formed at its free end that in its sweep in a counterclockwise direction in Fig. 24, it will as it approaches the middle of the resistance element 89ᵍ bridge the contacts 89ⁱ. The hand 89ᵉ is connected by a conductor 89ʲ with the other side of the motor 88 while the hand 89ᶠ is connected with the positive line of the current conductors 40—40 by a conductor 89ᵏ. The contacts 89ⁱ before mentioned are disposed in a line 89ˡ between the conductors 89ʲ and 89ᵏ. However, as the contacts 89ⁱ are normally spaced apart, the line 89ˡ is normally open.

It is obvious that the hands 89ᵉ and 89ᶠ in combination with the resistances 89ᵍ, 89ʰ, function as an electric rheostat with adjustable resistances that are interposed in the circuit for the pump motor 88.

Pairs of conductors 89ᵐ and 89ⁿ respectively connect the thermostat 89ᵇ and pressurestat 89ᵈ respectively with the mechanisms of the devices 89ª and 89ᶜ respectively that impart the sweeping movements to the hands 89ᵉ and 89ᶠ of said devices in a counterclockwise direction when viewed as in Fig. 24.

The thermostat 89ᵇ and pressurestat 89ᵈ are connected by a pair of conductors 89ˣ with the positive and negative sides of the conductors 40—40.

The pump 87 has an inlet 87ª that opens into the chamber 86 and an outlet 87ᵇ that leads to atmosphere outside the shell part 53.

In the operation of the apparatus, assume that the container 100 has been loaded with food products to be refrigerated. Under the influence of the thermostat 89ᵇ, a circuit is established to energize the motor 88 to drive the pump 87 to evacuate the interior of the assembly 50. In the passage of the assembly 50 through the freezing chamber 25, refrigeration of the food products in the container proceeds. With the pump 87 in operation, the temperature and the pressure in the container decreases. The thermostat 89ᵇ and pressurestat 89ᵈ then function to cause the hands 89ᵉ and 89ᶠ to swing counterclockwise and sweep over the resistance elements 89ᵍ and 89ʰ. The hand 89ᵉ causes an additional resistance to be introduced into the circuit for the motor 88 which decreases its speed and retards its rate of vacuous production in the assembly 50. In the pressure drop the hand 89ᶠ reduces the total resistance in the circuit of the motor 88 and tends to increase the speed thereof and its rate of vacuous production. By proper calibration of motor resistance in the circuit for the motor 88 a definite relationship between temperature and pressure in the container may be maintained.

The critical temperature range (say from 39° to 27° F.) of the products being refrigerated is that at which the products cease to contract in volume and start to expand, i. e. just prior to freezing. This temperature approaches or is arrived at when the hand 89ᵉ reaches about the mid point of its resistance element 89ᵍ at which time its free end bridges the contacts 89ⁱ. This cuts both devices 89ª and 89ᶜ and the resistances thereof out of operation so that the vacuum pump runs at its maximum speed producing a high vacuous condition very quickly to produce an abrupt temperature drop in the container. When the hand 89ᵉ passes either way from the contacts 89ⁱ normal function of the devices 89ª and 89ᶜ then again control.

When the freezing of the products has been accomplished and the temperature in the container is that desired with respect to the particular product, said temperature so affects the thermostat 98ª as to close the circuit through the conductors 98ᵇ and 98ᶜ from the source of current 40—40. This energizes the magnet 98ᵈ to separate the contacts 98ᵉ and 98ᶠ to break the circuit to the motor 88 which then stops. The valve 98 also becomes energized and opens to permit atmospheric air to enter the assembly 50 through the tube 97.

*Further statement of operational advantages*

From the foregoing detailed description many of the advantages will be at once obvious to those skilled in the art to which this invention appertains, but it will be helpful to call particular attention to certain features thereof, not by way of limitation, but by way of illustration.

The method and means disclosed provides essentially for the control of all factors that enter into the heat transfer process of food freezing such as temperature, pressure, volume of the product and vapor absorption or dehydration of the product.

The product container is a light weight, heat insulated container into which the product can be loaded in either loose or packaged form and yet provide for the free circulation of the air. When the valves are closed the product may be retained at a low temperature for a considerable period of time, even though the surrounding temperature is relatively high.

The pressure-temperature chamber is light in weight and of streamline design so that it causes a minimum of drag, or energy loss, when the cold air at high velocity passes around it. Within this chamber are located the air circulating means, vacuum pump and controls, all carried by one part of the chamber so that the other may be readily removed to position the product container in place. By means of the vacuum pump and the controls, the desired pressure relative to the temperature may be established and maintained so that the volume of the product in turn may be prevented from reducing to such an extent as to cause substantial loss of the vital constituents of the product.

The freezing chamber or tunnel is formed so that the entire air circulatory system thereof eliminates areodynamic drags or turbulences. Thus the refrigerating coils are of stream-line shape and are positioned to impose a minimum of resistance to air flow. Means are also provided in the system for taking practically all of the water vapor out of the circulating cold air. Since the cold air does not come into contact with any moisture bearing product (contacting only the outer surface of the pressure temperature chamber) there will be no absorption of vapor and no condensation on the refrigerating coils, thus greatly increasing their thermal efficiency and making continuous processing possible.

*The pressure temperature relation*

The relation between temperature and the pressure acting upon the product can be nicely related to the characteristics of the product being frozen. Thus the volume of the product may be maintained and the loss of vital constituents prevented as occurs when contraction of the product takes place during freezing operations under prior commercial practice.

Between 70° F. and 39° F. the pressure drop may be at substantially a uniform rate and in this temperature range may ordinarily be the same with respect to most products. In the critical temperature range from 39° F. to the freezing point (the freezing point varying somewhat with respect to different products but generally being in the 32° F.-27° F. range) the rate of pressure drop and the minimum pressure within temperature-pressure chamber should be modified, depending upon the structure of the food product. Thus, for the more delicately constructed food products the pressure drop from 39° F. to 32° F. at which freezing would take place the pressure might be from 13 lbs. pressure per square inch absolute to 6.7 lbs. With the more rugged type products, where freezing probably would not occur until about 27° F. the pressure range would be from 13 lbs. pressure per square inch absolute at 39° F. to say between 5 and 6 lbs. pressure at 27° F. Generally speaking, the lower the freezing point of the product, the lower the pressure. From the freezing point to the lowest temperature desired, there will generally be a still further lowering of the temperature, but as the drop will generally be uniform in this range the final pressures would still be different with respect to different products. When the freezing of the product has been completed, the pressure should not be raised suddenly and it is preferable to allow several minutes for such transition.

By means of the vacuum pump, the temperature responsive device, the pressure responsive device, and the control valve to the atmosphere external to that within the temperature-pressure chamber, the desired conditions within the chamber may be created. Obviously also any desired lag between temperature and pressure drop or rise may also be caused to occur. Hence, any desired condition may be established and maintained so that the product being frozen will retain unto itself the vital constituents which it possessed in its natural unfrozen state. Thus a new product is actually provided, i. e. a frozen food product, of which fruits, berries, vegetables, etc. are examples, which retains the weight volume and constituents of the natural product in its unfrozen state.

From the foregoing it is clear that the present invention affords a large number of advantages. All vegetables, fruits, meats and fish deteriorate quickly in temperatures usually prevalent during the harvest seasons. Most of them require mechanical processing between their natural state and their preserved state, such as the husking of corn, shelling of peas, stoning of peaches, hulling of strawberries, etc. Many of them require blanching before freezing.

After all of these processes speed must be employed in order to prevent spoilage. Much of the time consumed in prior commercial practices can be eliminated by utilizing the methods and apparatus of the present invention. Thus the same carriers for products may be employed in blanching and other pre-freezing operations and in transport from the scene of one operation to another as well as during the actual freezing process. Loose products may be blanched in the same carriers. After pre-freezing processes, the product may be loaded directly into the heat insulated product containers, which may be given preliminary refrigeration or chilling (as by small air blast units) to prevent spoilage while the product is being moved to the point where the freezing operation is performed. Thus, during delay periods which occur especially during seasons of maximum production and harvesting, much spoilage may be prevented.

By way of illustration and not by way of limitation, the following important advantages of the invention may be enumerated:

(1) Maximum possible retention of original "freshness."
(2) Minimum amount of dehydration of product.
(3) Minimum amount of weight loss in product.
(4) Continuous production on large and economical scale.
(5) Minimum amount of power consumption.
(6) Ease of transport of product between all operations.
(7) Adaptability to either loose or packaged products.
(8) Adaptability to various sizes of packages.
(9) Adaptability to different products at same time.
(10) Elimination of frosting on refrigeration units.
(11) Good work conditions for operators in high temperatures.
(12) Quick changes of freezing rates.
(13) Ease of expansion.
(14) Minimum floor space for maximum production.
(15) Low first cost.
(16) Low maintenance and operation costs.

While, in describing the invention, I have referred in detail to the form, arrangement and construction of the parts involved, and to certain steps in the processes or methods, the same is to be considered only in the illustrative sense so that I do not wish to be limited thereto except as may be specifically set forth in the appended claims.

I claim as my invention:

1. The method of freezing food products which consists in placing the same in a chamber, freezing the product therein, and in abruptly reducing the pressure in the chamber in the critical temperature range just prior to the freezing of the product.

2. The method of freezing food products which consists in placing the same in a chamber, freezing the product therein, in gradually reducing the pressure in the chamber during the initial temperature drop in the product, more abruptly reducing the pressure in the critical temperature range just prior to the freezing of the product, and in then gradually further reducing the pressure as the temperature of the product is lowered below that at which the product freezes.

3. In a refrigerating apparatus, a chamber comprising a plurality of parts made for quick conduction of heat units therethrough, for the freezing of products, means removably securing said parts together, actuating mechanism within the chamber for controlling the freezing of said products and means securing the actuating mechanism to one of the parts whereby the other may be freely removed to permit access to the interior of the chamber.

4. In a refrigerating apparatus, a chamber, means for refrigerating the chamber, means for circulating air within the chamber, and means for creating a partial vacuum within the chamber, said air circulating means being adapted to circulate a constant weight of air under different degrees of vacuum.

5. In a refrigerating system, a refrigerating chamber, a pressure chamber assembly adapted to contain the products to be refrigerated, air circulating means in said pressure chamber assembly and means for moving the pressure chamber assembly through the refrigerating chamber.

6. In a refrigerating system, a refrigerating chamber, a pressure chamber assembly adapted to contain the products to be refrigerated, means for circulating the air in the refrigerating chamber, air circulating means in said pressure chamber assembly and means for moving the pressure chamber assembly through the refrigerating chamber.

7. In a refrigerating system, a refrigerating chamber, a pressure chamber assembly adapted to contain the products to be refrigerated, lock means for the controlled admission of the pressure chamber assembly to the refrigerating chamber, said lock means comprising a lock chamber having doored communication with the atmosphere and with the refrigerating chamber respectively, and means for moving the pressure chamber assembly through the refrigerating chamber.

8. In a refrigerating system, a freezing chamber having a plurality of compartments, one thereof being unobstructed to permit the passage therethrough of a stream line product holding chamber and the others containing refrigerating elements, means for moving the stream line chamber through said compartment, and means for circulating air through said compartments in that direction which imposes a minimum resistance to air flow in passing said stream line chamber.

9. In a refrigerating system, a freezing chamber comprising central and side compartments, the central compartment being unobstructed to permit the passage therethrough of the products to be refrigerated, and the side compartments having refrigerating elements therein, means for circulating air in one direction through the central compartment and in the opposite direction in the side compartments and means for moving the products to be refrigerated through the central compartment in a direction opposite to that of the air movement therein.

10. The process of refrigerating food products which consists in placing the product to be refrigerated within a closed container having a gaseous-like atmosphere, providing a refrigerating medium, positioning the container so that exterior wall portions thereof contact the refrigerating medium, and causing movement of the gaseous-like atmosphere within the container so as to facilitate transfer of heat units, absorbed thereby from the food product, to and through said exterior wall portions which contact the refrigerating medium.

11. The process of refrigerating food products which consists in placing the product to be refrigerated within a closed elongated container having a gaseous-like atmosphere, providing a refrigerating medium, positioning the container so that exterior wall portions thereof contact the refrigerating medium, causing relative movement between the container and refrigerating medium, and causing longitudinal recirculation of the gaseous-like atmosphere within the container so as to facilitate transfer of heat units, absorbed thereby from the food product, to and through said exterior wall portions which contact the refrigerating medium.

12. The process of freezing food products which consists in placing the product to be refrigerated within a closed container having a gaseous-like atmosphere, refrigerating the product within the closed container, and in reducing and controlling the pressure of the gaseous-like container atmosphere as the temperature of the product is lowered so as substantially to maintain the original volume of the product as the temperature of the product is lowered.

13. A device of the kind described embodying therein an elongated hollow body, including a framing and an imperforate covering therefor made of material for the quick transmission of heat units therethrough, means providing an open ended chamber extending longitudinally of the body and spaced inwardly from the covering so as to leave an annular passage therebetween and which chamber is adapted to hold food products in spaced relation therein, means for circulating air longitudinally through said chamber and between the food products therein in one direction from one end to the other of said chamber and then longitudinally of the passage in the other direction toward the first mentioned end of the chamber, and means for reducing the pressure within the body.

14. A device of the kind described embodying therein an elongated hollow body, including a framing and an imperforate covering therefor made of material for the quick transmission of heat units therethrough, means providing an open ended chamber extending longitudinally of the body and spaced inwardly from the covering so as to leave an annular passage therebetween and which chamber is adapted to hold food products in spaced relation therein, means for circulating air longitudinally through said chamber and between the food products therein in one direction from one end to the other of said chamber and then longitudinally of the passage in the other direction toward the first mentioned end of the chamber, and a vacuum pump for reducing the pressure within the body.

15. In a refrigerating device, an elongated hollow body having an imperforate shell, an elongated product holding box removably positioned within the hollow body and being suspended from a part thereof, a portion of said shell being separable to permit attachment of the box to and removal thereof from the said body part, and means for circulating air through the box and into contact with the imperforate shell of the body.

16. In a refrigerating device, an elongated hollow streamlined body having an imperforate shell, an elongated product holding box removably positioned within the hollow body and being suspended from a part thereof, a portion of said shell being separable to permit attachment of the box to and removal thereof from the said body part, and means for circulating air through the box and into contact with the imperforate shell of the body.

HARRY W. PROTZELLER.

REFERENCES CITED

The following references are of record in the file of this patent:

UNITED STATES PATENTS

| Number | Name | Date |
|---|---|---|
| 556,692 | Purves | Mar. 17, 1896 |
| 1,228,523 | Best | June 5, 1917 |
| 1,930,414 | Buhr | Oct. 10, 1933 |
| 1,933,257 | Goosman | Oct. 31, 1933 |
| 1,948,790 | Grayson | Feb. 27, 1934 |
| 2,077,608 | Wood | Apr. 20, 1937 |
| 2,083,436 | De Bothesat | June 8, 1937 |
| 2,109,002 | Warren | Feb. 22, 1938 |
| 2,116,813 | Weisser | May 10, 1938 |
| 2,136,969 | Downey | Nov. 15, 1938 |
| 2,149,912 | Fuss | Mar. 7, 1939 |
| 2,201,411 | Smith | May 21, 1940 |
| 2,223,020 | Ohlhaver | Nov. 26, 1940 |
| 2,277,382 | Botz | Mar. 24, 1942 |
| 2,345,204 | Lodwig | Mar. 28, 1944 |

FOREIGN PATENTS

| Number | Country | Date |
|---|---|---|
| 521,040 | Germany | Mar. 18, 1931 |